United States Patent
Yu et al.

(10) Patent No.: US 11,245,688 B2
(45) Date of Patent: Feb. 8, 2022

(54) DEVICE AUTHENTICATION METHOD

(71) Applicant: WALTON ADVANCED ENGINEERING INC., Kaohsiung (TW)

(72) Inventors: Hong Chi Yu, Kaohsiung (TW); Mao Ting Chang, Kaohsiung (TW)

(73) Assignee: WALTON ADVANCED ENGINEERING INC., Kaohsiung (TW)

(*) Notice: Subject to any disclaimer, the term of this patent is extended or adjusted under 35 U.S.C. 154(b) by 260 days.

(21) Appl. No.: 16/406,050

(22) Filed: May 8, 2019

(65) Prior Publication Data
US 2020/0267140 A1 Aug. 20, 2020

(30) Foreign Application Priority Data
Feb. 19, 2019 (TW) .................................. 108105490

(51) Int. Cl.
*H04L 29/06* (2006.01)
(52) U.S. Cl.
CPC ...... *H04L 63/0853* (2013.01); *H04L 63/0272* (2013.01); *H04L 63/0869* (2013.01)
(58) Field of Classification Search
CPC ............. H04L 63/0853; H04L 63/0272; H04L 63/0869; H04L 63/0884
See application file for complete search history.

(56) References Cited

U.S. PATENT DOCUMENTS

| | | | | |
|---|---|---|---|---|
| 7,669,229 B2* | 2/2010 | Grobman | ............ | H04L 63/0884 726/2 |
| 8,601,569 B2* | 12/2013 | Segre | .................... | H04L 63/162 726/15 |
| 9,148,408 B1* | 9/2015 | Glazemakers | ........ | H04L 63/029 |
| 2008/0016537 A1* | 1/2008 | Little | .................... | H04W 12/08 725/81 |
| 2008/0134305 A1* | 6/2008 | Hinton | .................... | H04L 63/08 726/5 |
| 2011/0202988 A1* | 8/2011 | Otranen | ................ | H04L 9/3213 726/8 |

(Continued)

OTHER PUBLICATIONS

SoftEtherVPN Project, Jan. 8, 2019, University of Tsukuba, Japan, https://web.archive.org/web/20190108215818/https://www.softether.org/, pp. 1-27 (Year: 2019).*

*Primary Examiner* — Chau Le
(74) *Attorney, Agent, or Firm* — Bacon & Thomas, PLLC

(57) ABSTRACT

The present disclosure relates to a device authentication method as a procedure designed for authenticity of an apparatus. A connecting apparatus to be authenticated and an authentication box are connected to a trusted network through which authentication information is received by the connecting apparatus. The connecting apparatus is electrically connected to a non-trusted network through which the connecting apparatus and an intermediary server are electrically connected with each other; a virtual hub network is created by the intermediary server and electrically connected to both the authentication box and the connecting apparatus such that the connecting apparatus is authenticated by authentication box based on the authentication information.

8 Claims, 7 Drawing Sheets

(56) References Cited

U.S. PATENT DOCUMENTS

| | | | | |
|---|---|---|---|---|
| 2011/0252230 | A1* | 10/2011 | Segre | H04W 76/12 |
| | | | | 713/155 |
| 2013/0046976 | A1* | 2/2013 | Rosati | H04W 12/069 |
| | | | | 713/168 |
| 2013/0227291 | A1* | 8/2013 | Ahmed | H04L 63/0884 |
| | | | | 713/171 |
| 2015/0121500 | A1* | 4/2015 | Venkatanaranappa | ........ |
| | | | | H04L 63/0815 |
| | | | | 726/8 |
| 2017/0317981 | A1* | 11/2017 | Klein | H04W 12/041 |
| 2019/0005227 | A1* | 1/2019 | Weinstein | H04L 9/3234 |

* cited by examiner

DEVICE AUTHENTICATION METHOD

BACKGROUND OF THE INVENTION

1) Field of the Invention

The present disclosure relates to a remote authentication method and particularly relies on an authentication box to authenticate an apparatus in advance and further an intermediary server connected to the authentication box via the internet to ensure authenticity of the apparatus for supplies of following services from the authentication box.

2) Description of the Prior Art

The internet with which a variety of applications, for example, online transaction, online fax service, cloud hard drive and remote monitoring, to bridge the distance conveniently are available brings users price advantages and flexibility inaccessible traditionally.

However, blessings never come in pairs because those malicious attacks on network transmissions go viral. A user who is carrying on an online transaction probably opens a Pandora's box from which all kind of threats to be blocked with caution particularly such as fake website, malicious redirection, forged security seal and Troja dropper are released.

The patent documentations with respect to network security are shown as follows:

U.S. patent Ser. No. 14/526,393 discloses a method based on a public cloud network, a private cloud routing server and a smart-device client. The method comprises configurations for a private cloud routing server and a smart-device client in client-server relationships. The private cloud server comprises a first message box. The smart-device client comprises a second message box. The first and second message boxes are located on the public cloud network. The method also comprises a safe mode with which authenticated session information is transmitted between the first message box and the second message box. The smart-device client and the private cloud routing server communicate with each other after a safe authentication is completed. The method further comprises configurations for another smart-device client and the private cloud routing server in client-server relationships. Then, the two smart-device clients will communicate with each other secretly and safely via the public cloud network.

Japan Patent JP 2015-178562 discloses a device security management apparatus which comprises: a communications unit which communicates with a device through a network inside a building; a memory unit in which a plurality of users' measured biological characteristic data is stored; a measured biological characteristic data acquisition unit which acquires measured biological characteristic data from a device through the communications unit; a measured biological characteristic authentication unit in which measured biological characteristic data is compared with stored biological characteristic data for authenticating an operator who matches the measured biological characteristic data; a device control unit, which informs the device of control information for the device operable when the operator matching the measured biological characteristic data is authenticated by the measured biological characteristic authentication unit or informs the device of control information for the device inoperable when the measured biological characteristic data of the operator is not authenticated by the measured biological characteristic authentication unit.

R.O.C. patent TW I632797 discloses a new approach which supports secured hardware security module (HSM) backups for a plurality of web services hosted in a cloud to offload key storage, management, and crypto operations to the HSM. Each HSM is a high-performance FIPS 140-compliant security solution for crypto acceleration of web services. Each HSM comprises multiple partitions isolated from one another; each HSM partition is specifically used in supporting either a web service host or a server for offloading crypto operations via a HSM virtual machine (VM) over the network. The HSM-VM is configured to export objects from the key store of a first HSM partition to a key store of a second HSM partition wherein the second HSM partition is configured to serve key management/crypto operations offloaded from the web service host when the objects exported from the key store of the first HSM partition are received.

However, either the safety of authenticated information during transmission or the independency of an authentication platform remains imperfect. In the present disclosure, a device authentication method is provided to set the record straight.

SUMMARY OF THE INVENTION

In view of the above problems, a device authentication method in the present disclosure is based on an authentication box for protection of authenticity.

Accordingly, a device authentication method provided in the present disclosure is characteristic of information exchanges between an authentication box and a connecting apparatus first for acquisition of authentication information.

A device authentication method provided in the present disclosure comprises an authentication box with which authentication information corresponding to a unique connecting apparatus is protected and not stolen during transmission.

A device authentication method provided in the present disclosure relies on a request code of an authentication box to ensure authentic electric connection between the authentication box and a connecting apparatus.

A device authentication method provided in the present disclosure makes use of an intermediary server with which authentication information is transmitted such that an authentication box is not accessed by an unauthenticated apparatus directly.

A device authentication method provided in the present disclosure relies on an authentication box for accessibility of multiple back-end resources by an authenticated apparatus.

A device authentication method provided in the present disclosure is characteristic of a single authentication for no requirement of repeated authentications on a privacy network in the backend.

To this end, a device authentication method is embodied according to the following technical measures. A device authentication method in the present disclosure comprises steps as follows: step 1: an authentication box and a connecting apparatus are electrically connected to a trusted network through which information is exchanged between the authentication box and the connecting apparatus and authentication information is received by the connecting apparatus; step 2: the connecting apparatus is electrically connected to an extranet through which both the connecting apparatus and an intermediary server are electrically connected with each other; step 3: a virtual hub network is created by the intermediary server and electrically connected with both the authentication box and the connecting apparatus; step 4: the connecting apparatus is authenticated by the authentication box based on the authentication information.

A device authentication method is further embodied according to the following steps technically.

In the device authentication method, a request code is transmitted to the authentication box by the connecting apparatus simultaneously in step 1.

In the device authentication method, the authentication information transmitted to the intermediary server by the connecting apparatus is checked and authenticated in the intermediary server by the authentication box (10) first after step 2.

In the device authentication method, the authentication box and the connecting apparatus access to each other via the internet directly after step 4.

In the device authentication method, a privacy network or privacy equipment is accessed by the connecting apparatus through the authentication box after step 4.

In the device authentication method, an electric connection is available via a wired or wireless network.

In the device authentication method, encryption communications is available between the authentication box and the connecting apparatus.

In the device authentication method, the authentication information matches information about a physical address of the connecting apparatus.

In the device authentication method, the authentication box is configured to link multiple back-end resources.

In contrast to the prior arts, a device authentication method in the present disclosure proves effective in: (1) a connecting apparatus is authenticated by an authentication box for safety; (2) information exchanges are launched through an authentication box for no complicated authentication in the back end; (3) authentication information is transmitted by an intermediary server such that an authentication box is not accessed by an unauthenticated apparatus directly.

BRIEF DESCRIPTIONS OF THE DRAWINGS

DETAILED DESCRIPTIONS OF THE PREFERRED EMBODIMENTS

A device authentication method is explained in the preferred embodiments for clear understanding of purposes, characteristics and effects of the present disclosure.

Figure 1A:
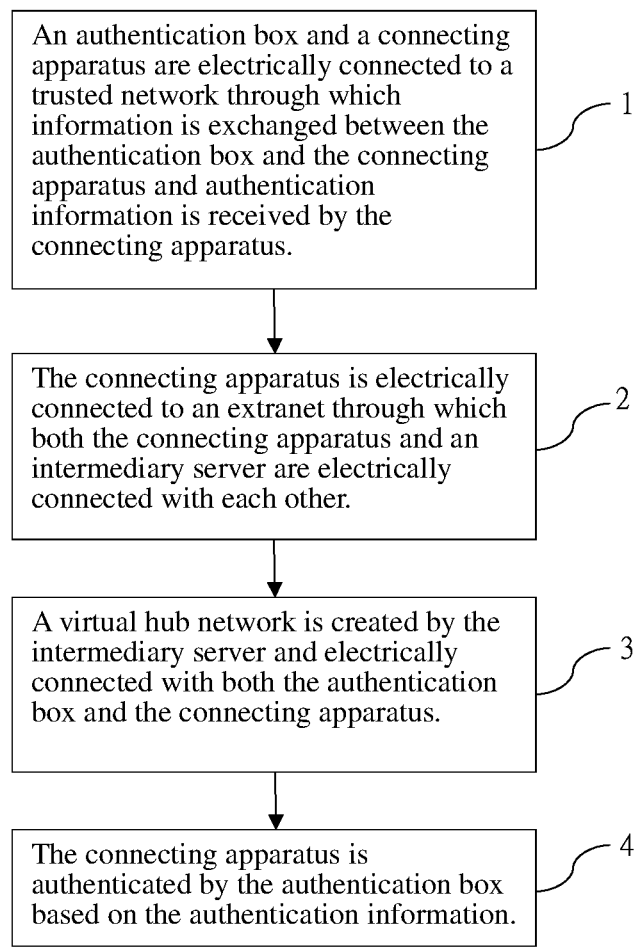
FIG. 1a is the first flowchart of a device authentication method in the first embodiment.

Referring to FIG. 1a, which illustrates a device authentication method in the first embodiment comprises step 1 (1), step 2 (2), step 3 (3) and step 4 (4).

Figure 3A:
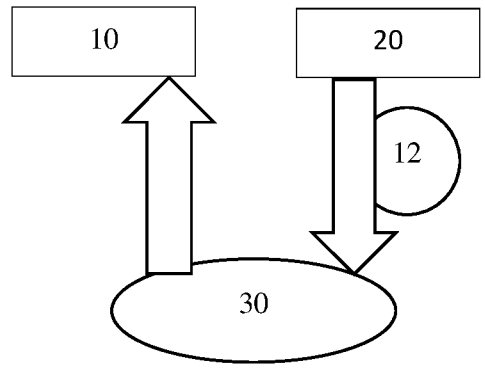
FIG. 3a is the first schematic view of a device authentication method in a preferred embodiment.
Figure 3B:
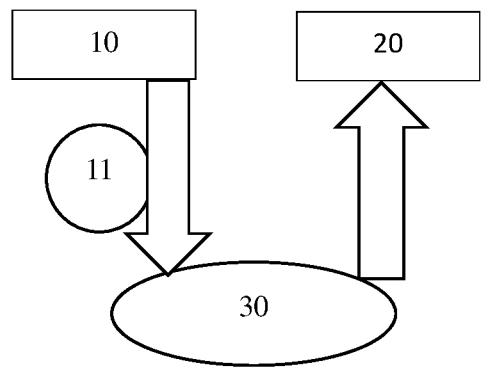
FIG. 3b is the second schematic view of a device authentication method in a preferred embodiment.

Referring to FIG. 1a for step 1 (1) and FIG. 3b: step 1 (1) is a step to electrically connect an authentication box (10) and a connecting apparatus (20) to a trusted network (30) through which information is exchanged between the authentication box (10) and the connecting apparatus (20) and authentication information (11) is received by the connecting apparatus (20). In general, the authentication box (10), which is an appliance for data processing, encryption communications, online information exchanges and safety verification, serves as authentication and links other resources by itself for bridges or accesses to authenticated devices as well as internet communications; the connecting apparatus (20) is an electronic appliance for accesses to the internet such as desktop computer, tablet device or mobile device in which application programs are installed for acquisition of information via the internet; the trusted network (30), which can be WAN (Wide Area Network) or LAN (Local Area Network), for example, Ethernet and Wi-Fi for network connection used customarily and technically, wherein WAN is available in specific IP addresses for safety consideration; the authentication information (11) comprises a verification code generated for matching a physical address of the connecting apparatus (20) but is not available to other unauthenticated appliances; the electrical connection in the embodiment is available via a wired or wireless network and encryption communications is available between the authentication box (10) and the connecting apparatus (20). Furthermore, referring to FIG. 1a for step 2 (2) and FIG. 3c that illustrate the connecting apparatus (20) is electrically connected to an extranet (31) through which both the connecting apparatus (20) and an intermediary server (40) are electrically connected with each other in step 2 (2).

In general, the extranet (31) is a network for internet communications but not categorized as the trusted network (30); the intermediary server (40) functions as an intermediate platform with which both the authentication box (10) and the connecting apparatus (20) are bridged but records no authentication information (11); either the authentication box (10) or the connecting apparatus (20), each of which has linked the internet, is electrically connected with the intermediary server (40) automatically.

Figure 3C:
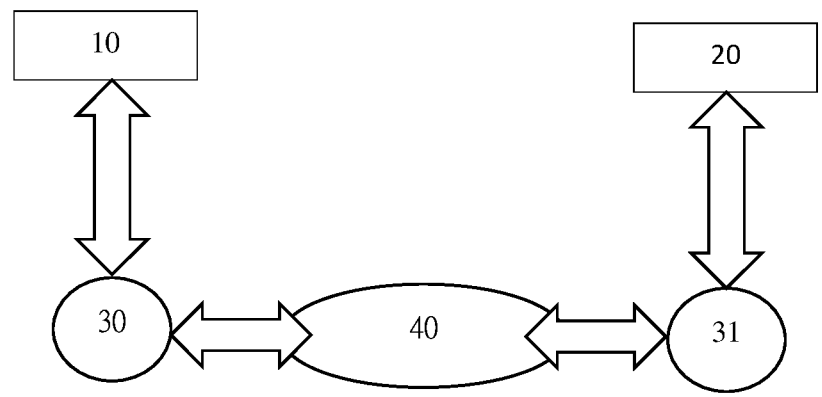
FIG. 3c is the third schematic view of a device authentication method in a preferred embodiment.
Figure 3D:
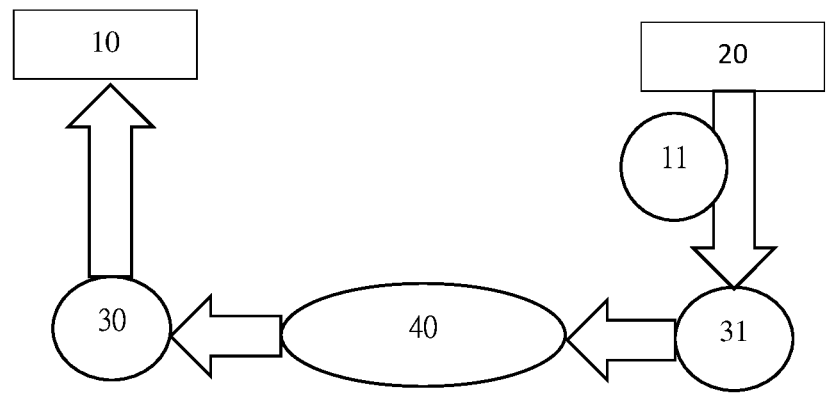
FIG. 3d is the fourth schematic view of a device authentication method in a preferred embodiment.
Figure 3E:
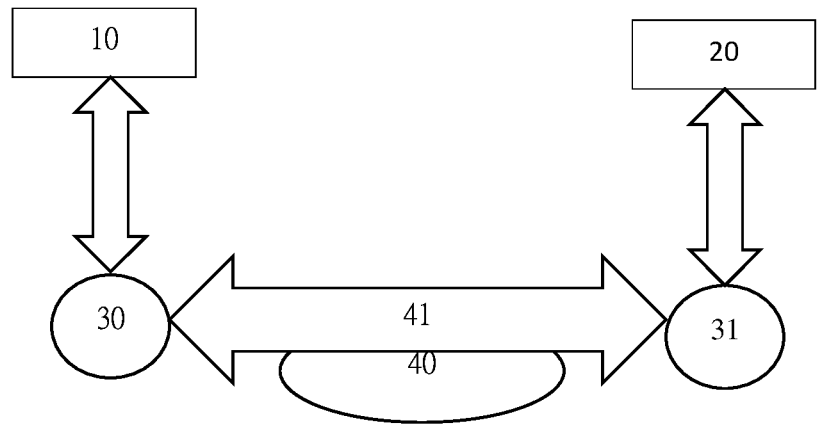
FIG. 3e is the fifth schematic view of a device authentication method in a preferred embodiment.

Then, referring to FIG. 1a for step 3 (3) and FIG. 3e, which illustrate a virtual hub network (41) is created by the intermediary server (40) and electrically connected with both the authentication box (10) and the connecting apparatus (20) in step 3 (3).

In the present disclosure, the virtual hub network (41) is a packet-switched network in structure between an adapter on a physical network and a virtual hub, for example, SoftEther VPN most common in applications, for traffic across a firewall, NAT traversal and information exchanges among devices on different networks accessibly.

Finally, referring FIG. 1a for step 4 (4) and FIG. 3e, which illustrate the connecting apparatus (20) is authenticated by the authentication box (10) based on the authentication information (11) in step 4 (4). In step 4 (4), the authentication information (11) which is transmitted to the authentication box (10) from the virtual hub network (41) by the connecting apparatus (20) should match with the connecting apparatus (20) through the authentication box (10) for completion of a protocol for connectivity between the authentication box (10) and the connecting apparatus (20).

Figure 1B:
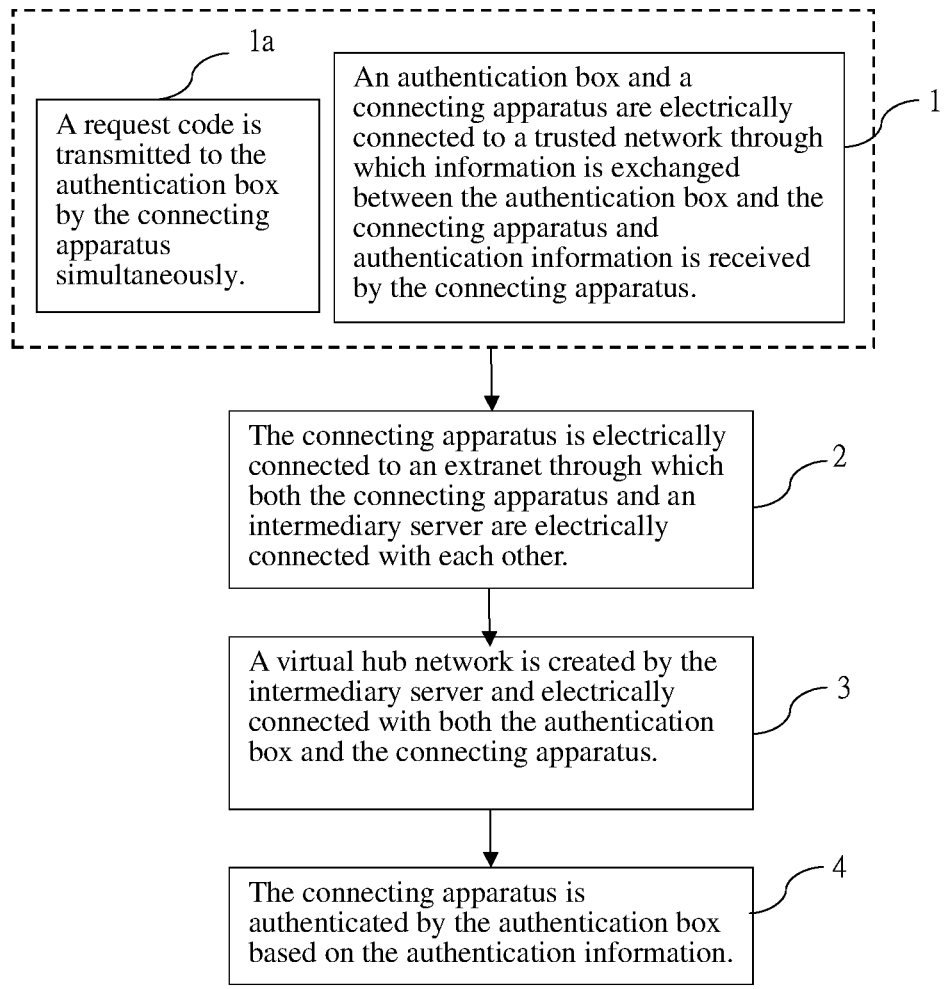
FIG. 1b is the second flowchart of a device authentication method in the first embodiment.

In practice, step 1 (1) which is executed in the embodiment first could be accompanied with one more step, step 1a (1a), simultaneously. Referring to FIGS. 1b and 3a, which illustrate a request code (12) is transmitted to the authentication box (10) from the connecting apparatus (20) in step 1a (1a) and step 1 (1).

Figure 2A:
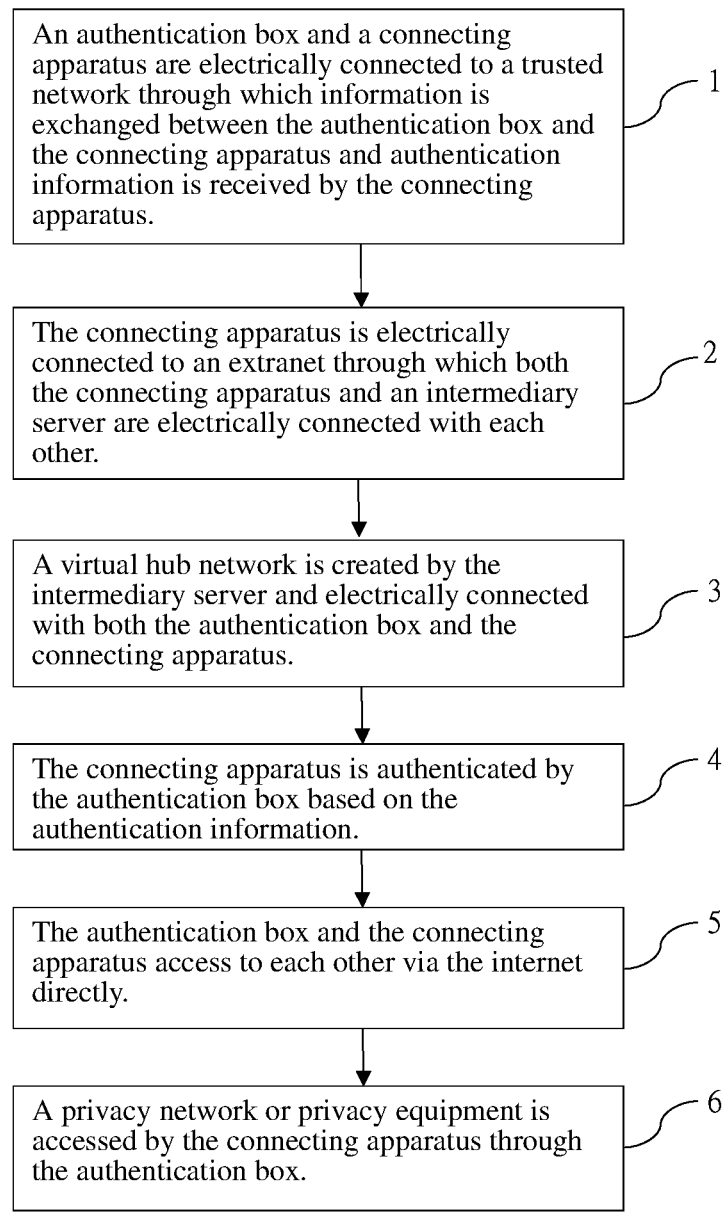
FIG. 2a is the first flowchart of a device authentication method in the second embodiment.

In step 1a (1a), the connecting apparatus (20) on the trusted network (30) should be the target to acquire the authentication information (11) assuredly for no unauthorized apparatus accessing an authentication procedure; furthermore, the request code (12) can be generated from the authentication box (10) by software or adhered on the authentication box (10) by a manufacturer. Referring to FIG. 2a, which illustrates a device authentication method in the second embodiment in which the characteristics identical to those of the first embodiment in FIGS. 1a and 1b are not explained hereinafter. The differences in the second embodiment differing from the first embodiment are step 5 (5) and step 6 (6) after step 4 (4).

Referring to FIG. 2a for a flowchart of the second embodiment, which comprises step 1 (1), step 2 (2), step 3 (3), step 4 (4), step 5 (5) and step 6 (6).

Referring to FIG. 2a for step 1 (1) and FIG. 3b, which illustrate an authentication box (10) and a connecting apparatus (20) in step 1 (1) are electrically connected with a trusted network (30) through which information is exchanged between the authentication box (10) and the connecting apparatus (20) and authentication information (11) is received by the connecting apparatus (20).

Figure 2B:
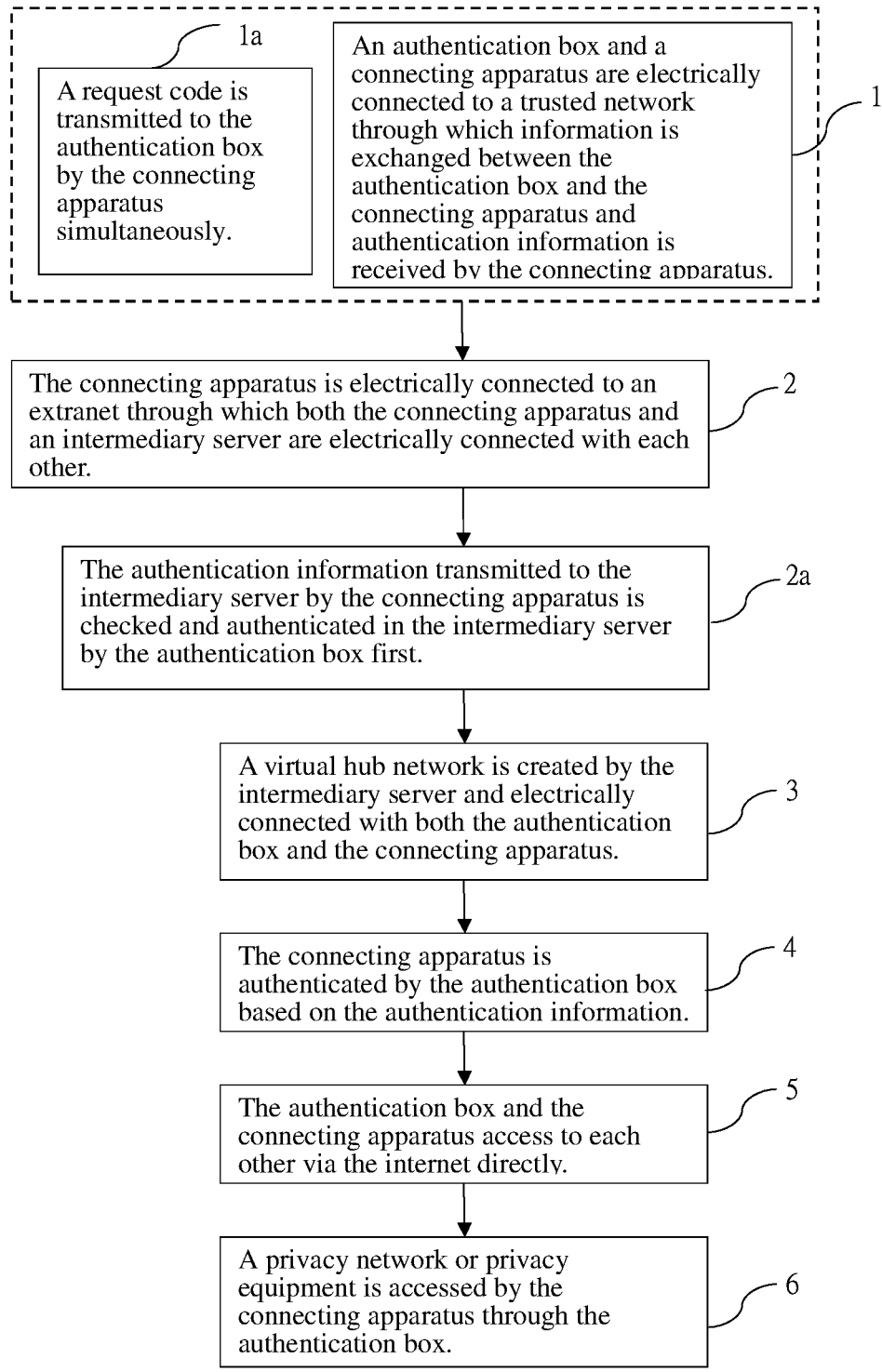
FIG. 2b is the second flowchart of a device authentication method in the second embodiment.

As mentioned previously, step 1a (1a) can be further added; referring to FIGS. 2b and 3a, which illustrate a request code (12) is transmitted to the authentication box (10) from the connecting apparatus (20) in step 1a (1a) and step 1 (1) simultaneously.

Moreover, referring to FIG. 2a for step 2 (2) and FIG. 3c that illustrate the connecting apparatus (20) is electrically connected to an extranet (31) through which both the connecting apparatus (20) and an intermediary server (40) are electrically connected with each other in step 2 (2).

Preferably, step 2a (2a) is further added. Referring to FIGS. 2b and 3d, which illustrate the authentication information (11) transmitted to the intermediary server (40) by the connecting apparatus (20) is checked and authenticated in the intermediary server (40) by the authentication box (10) first in step 2a (2a) after step 2 (2); in this way, authentication information is transmitted by an intermediary server assuredly for no unauthorized apparatus accessing the authentication box directly.

Referring to FIG. 2a for step 3 (3) and FIG. 3e, which illustrate a virtual hub network (41) in step 3 (3) is created by the intermediary server (40) and both the authentication box (10) and the connecting apparatus (20) are electrically connected with the virtual hub network (41).

Referring to FIG. 2a for step 4 (4) and FIG. 3e, which illustrate an authentication procedure for the connecting apparatus (20) in step 4 (4) is completed by the authentication box (10) based on the authentication information (11).

Moreover, referring to FIG. 2a for step 5 (5) and FIG. 3e, which illustrate the authentication box (10) and the connecting apparatus (20) access to each other via the internet directly in step 5 (5).

In particular, a protocol for connectivity between the authentication box (10) and the connecting apparatus (20) is created in step 4 (4) such that information like printer location, file location and internal public information disclosed by the authentication box (10) is accessed in step 5 (5). In addition to information disclosed by the authentication box (10), multiple back-end resources configured in the authentication box (10) in advance for accessing and disclosed in step 5 (5) are accessed after completion of an authentication procedure.

Figure 3F:
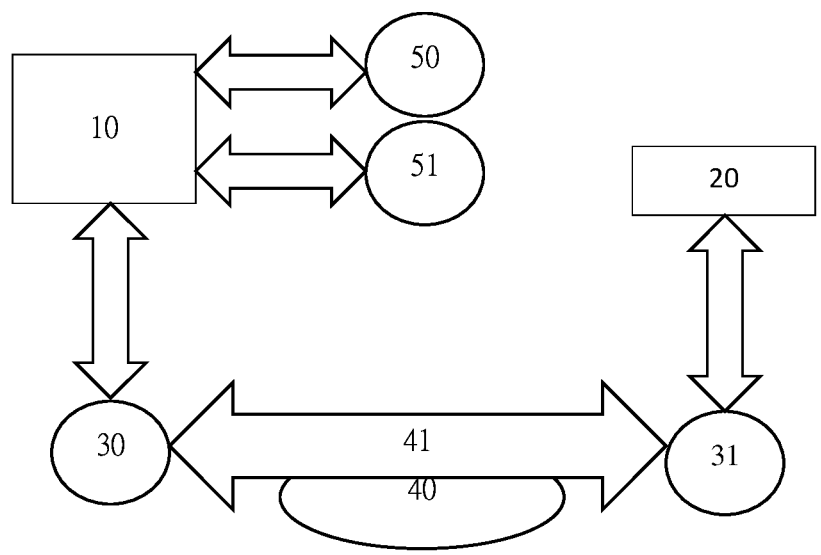
FIG. 3f is the sixth schematic view of a device authentication method in a preferred embodiment.

Finally, referring to FIG. 2 for step 6 (6) and FIG. 3f, which illustrate a privacy network (50) or privacy equipment (51) is accessed by the connecting apparatus (20) through the authentication box (10) in step 6 (6).

In this regard, either the privacy network (50), which is a personal network or an office network, or the privacy equipment (51), which is equipment for storages of confidential files, is categorized as a network not accessed from outside directly. In the present disclosure, a device authentication method supports a single authentication for no requirement of repeated authentications on a privacy network in the back end and allows another authentication after step 6 (6) as required. Accordingly, a device authentication method which is different from an ordinary device authentication method and referred to as creative work in applications of network devices meets patentability and is applied for the patent.

It should be reiterated that the above descriptions present the preferred embodiments, and any equivalent changes in specifications, claims or drawings still belongs to the technical field within the present disclosure with reference to claims hereinafter.

What is claimed is:

1. A device authentication method, comprising:
   step 0: providing an authentication box with a pre-adhered request code for protection of authenticity;
   step 1: exchanging information between the authentication box and a connecting apparatus first for acquisition of authentication information to authenticate an apparatus in advance;
   step 1a: transmitting a request code to the authentication box from the connecting apparatus simultaneously to ensure the authentic electric connection between the authentication box and the connecting apparatus;
   step 2: the connecting apparatus is electrically connected to an extranet through which both the connecting apparatus and an intermediary server are electrically connected with each other, wherein the authentication information is transmitted by the intermediary server such that the authentication box is not accessed by an unauthenticated apparatus directly;
   step 3: the intermediary server is connected to the authentication box via the internet to ensure the authenticity of the apparatus for supplies; and
   step 4: the connecting apparatus is authenticated by the authentication box based on the authentication information.

2. The device authentication method as claimed in claim 1 wherein the authentication information transmitted to the intermediary server by the connecting apparatus is checked and authenticated in the intermediary server by the authentication box first after step 2.

3. The device authentication method as claimed in claim 1 wherein, after step 4, the authentication box and the connecting apparatus access to each other via the internet directly.

4. The device authentication method as claimed in claim 3 wherein privacy equipment is accessed by the connecting apparatus through the authentication box after step 4.

5. The device authentication method as claimed in claim 1 wherein an electric connection is available via a wired or wireless network.

6. The device authentication method as claimed in claim 1 wherein encryption communications is available between the authentication box and the connecting apparatus.

7. The device authentication method as claimed in claim 1 wherein the authentication information matches information about a physical address of the connecting apparatus.

8. The device authentication method as claimed in claim 1 wherein the authentication box is configured to link multiple back-end resources.

\* \* \* \* \*